ELECTRONIC SWITCH

Filed Jan. 12, 1950 2 SHEETS—SHEET 1

INVENTOR
Edwin A. Goldberg
BY Charles H. Brown
ATTORNEY

INVENTOR
Edwin A. Goldberg
BY Charles H. Brown
ATTORNEY

Patented Mar. 17, 1953 2,632,046

UNITED STATES PATENT OFFICE 2,632,046

ELECTRONIC SWITCH

Edwin A. Goldberg, Princeton Junction, N. J., assignor to Radio Corporation of America, a corporation of Delaware Application January 12, 1950, Serial No. 138,168

16 Claims. (Cl. 178—5.4)

This invention relates broadly to an electrically controlled electronic switch for coupling a signal source to an output circuit. From a more specific aspect, the invention relates to an electronic commutator employing a plurality of electronic switches under control of a common source of recurring waves for sequentially assigning a common transmission circuit to a plurality of branch circuits.

The electronic switch of the invention is in the nature of a keyer and is hereinafter referred to as a "sampler" which responds to a control wave or pulse for enabling the passage therethrough of a sample of the intelligence to be carried by the system. A plurality of these electronic switches, each individual to a particular branch circuit, may compose the electronic commutator, and are successively controlled by time displaced control waves, to thereby sequentially connect the individual branch circuits for mutually exclusive (or, if desired, overlapping) time intervals to a common transmission medium. Such electronic commutators are especially useful at the transmitting and receiving terminals of a time division multiplex system in which the commutator functions to sequentially connect a common output circuit to a plurality of separate intelligence carrying branch circuits, or to connect a common input circuit to a plurality of separate intelligence reproducing branch circuits. At the transmitting terminal of a time division multiplex system, this transmission medium may be the common output circuit feeding any suitable radio transmitter.

The commutator of the invention is particularly useful in a color television system, though not limited thereto, wherein the apparatus of the invention samples color information from a plurality of individual branch circuits or color channels. The individual color channels are located at the terminal equipment. In such a color television system, bits of video information at the transmitter emanating from three branch circuits or color channels, such as green, red and blue, each fed by the output of a separate color camera, are sequentially fed into a common output circuit. Each color camera is responsive to a different one of three additively primary color components of the color image to be transmitted. The output of the commutator comprises a series of pulses divisible into groups of three, the amplitude variations of each pulse or of a given group corresponding to the light intensity variations of the color component it represents. At the receiver, an electronic commutator operating in synchronism with the transmitter commutator, applies the demodulated pulses to the three receiving branch circuits or color channels in a manner somewhat similar to the way the transmitter commutator operates.

Among the objects of the invention are: To enable the rapid and efficient sampling of an intelligence wave for very short time periods solely at a signal level exceeding a predetermined value, and with no loss in gain through the sampling apparatus; and, to provide an improved electronic commutator primarily applicable to dot sequential color systems, for sequentially coupling a common transmission medium to a plurality of color channels.

More specifically, the electronic switch of the invention comprises a pair of electron discharge devices having a common cathode circuit in the form of a third electron discharge device. A source of signal intelligence or modulation to be passed by the switch is coupled to the third discharge device, while a source of recurring control waves is coupled to one of the pair of discharge devices. The circuit components are so interconnected that under the control of the recurring waves, current flows in series through the third discharge device and alternately through the pair of discharge devices. An output circuit is preferably coupled directly to that one of the pair of discharge devices to which the controlling waves are applied, for abstracting pulses at a rate not exceeding the repetition rate of the controlling waves. The amplitude of the output pulses is a function of the instantaneous amplitude of the modulation wave applied to the common cathode circuit.

The commutator of the invention, as used at the transmitting terminal of the three-color television system, comprises three such electronic switches sequentially controlled by phase-displaced control waves of the same frequency emanating from a single source. The different electronic switches have different signal or intelligence carrying waves applied thereto. It should be understood that the number of branch circuits or color channels may differ from three, in which case the commutator will comprise as many electronic switches as there are branch circuits.

At the receiving terminal of the three-color television system, the commutator of the invention preferably uses one such electronic switch with two additional electron discharge devices properly interconnected to share the common cathode circuit with the pair of electron discharge devices. These devices are so arranged that the current flows through the common cathode circuit or third discharge device and in series with but at different times through the other discharge devices.

Other objects will appear from a reading of the following detailed description which is accompanied by drawings, wherein.

Figure 2:
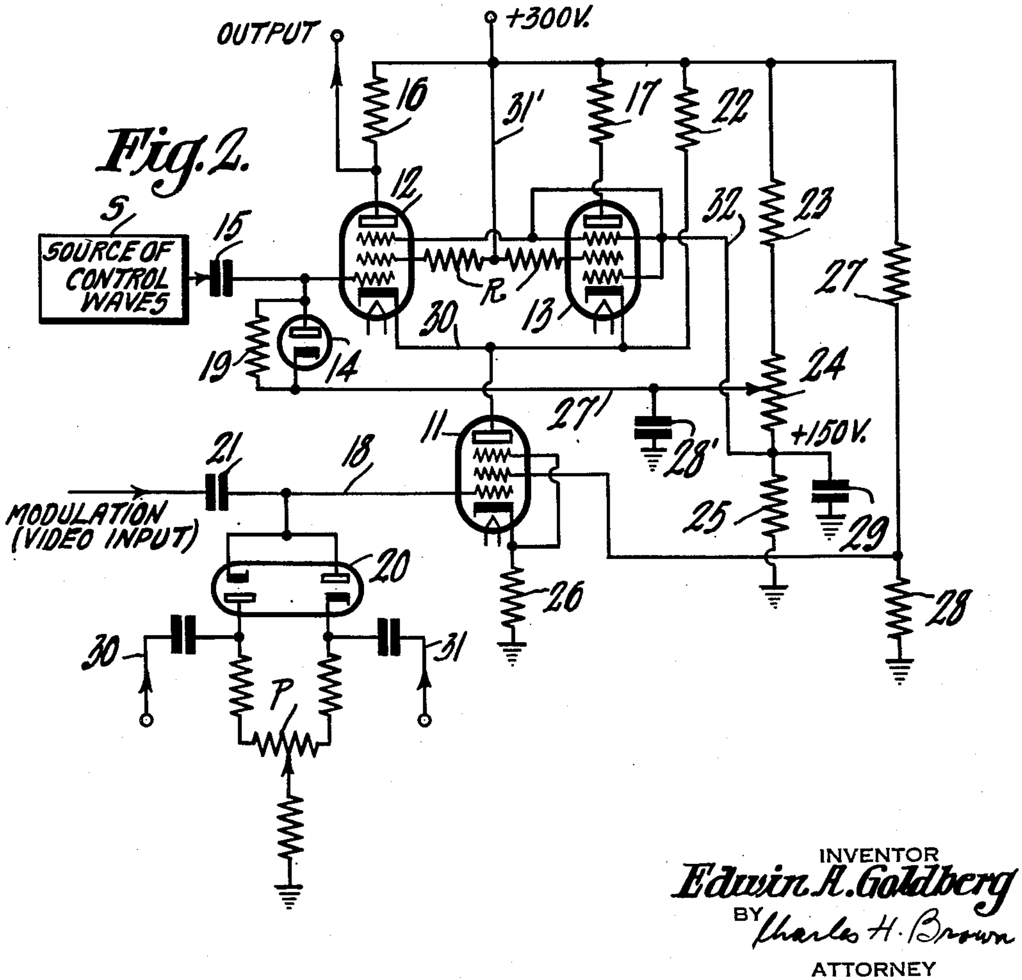
Fig. 2 illustrates a preferred form of electronic switch of the invention.
Figure 3:
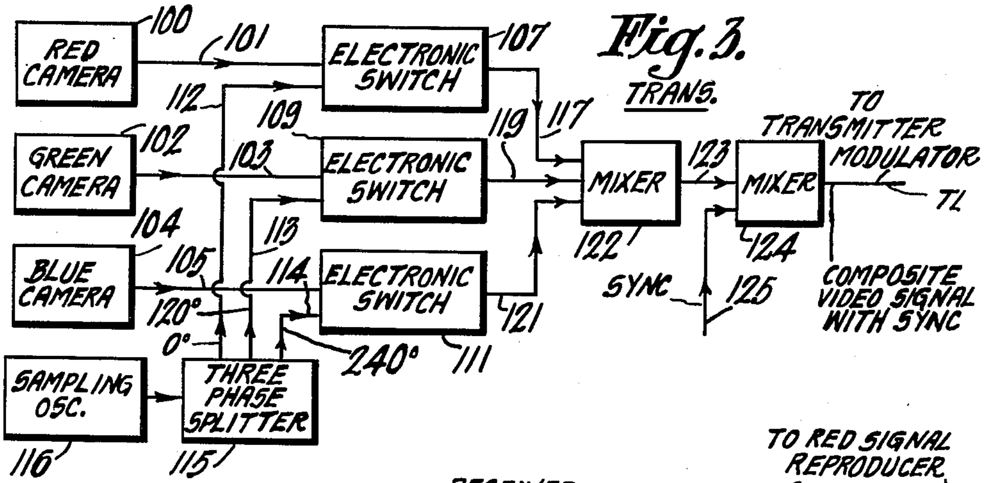
Figure 4:
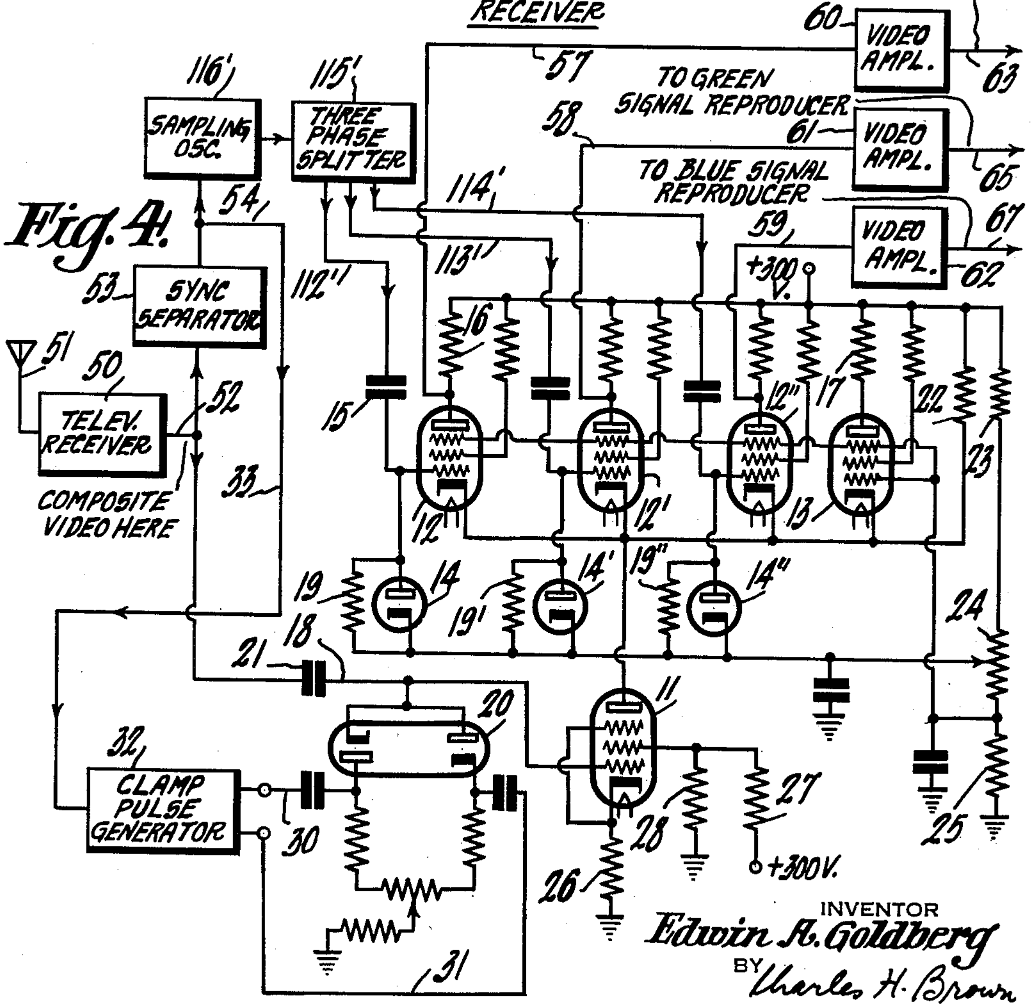

Fig. 3 illustrates diagrammatically, the transmitting terminal equipment of a three-color dot sequential television system employing a commutator in which three electronic switches of the type shown in Fig. 2 are employed; and Fig. 4 illustrates diagrammatically the receiving terminal equipment of a three-color dot sequential television system employing the commutator of the invention, for receiving the signals transmitted by the system of Fig. 3.

Figure 1:
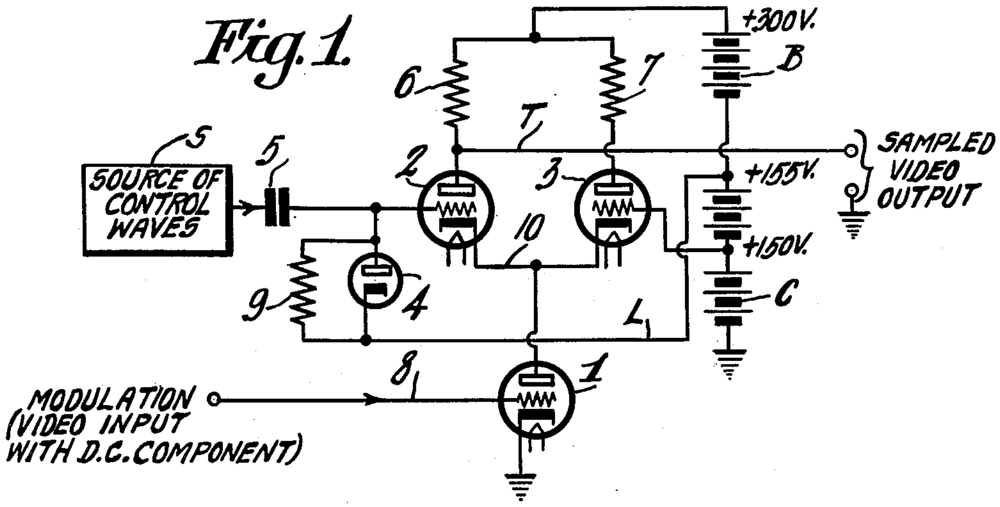
Fig. 1 illustrates a simplified version of an electronic switch in accordance with the invention, given primarily to illustrate the principles involved.

Referring to Fig. 1 in more detail, the electronic switch comprises a pair of evacuated electron discharge devices (vacuum tubes) 2 and 3 having their cathodes directly connected together by a connection 10 and their anodes connected respectively through low value resistors 6 and 7 to the positive terminal of a battery B (source of unidirectional potential). Battery B is arranged in series with battery C to ground, and supplies a voltage of 300 volts positive to the anode resistors 6 and 7 relative to ground. The pair of discharge devices 2 and 3 have a common cathode circuit in which there is serially arranged a third evacuated electron discharge device 1, as a result of which any current which flows through either device 2 or 3 must flow in series through discharge device 1. Device 1 thus constitutes a space path impedance in the common cathode circuit of discharge devices 2 and 3.

The intelligence signal or modulation to be sampled or passed by the electronic switch of the invention is coupled to the grid of discharge device 1 by way of lead 8. This modulation is of positive polarity and may be a video color signal of varying amplitude with a D. C. component, or in the case of a telephone or telegraph system may be in the form of speech waves of varying amplitude or pulses of positive relative polarity.

The control electrode or grid of discharge device 3 is shown connected to the junction of batteries B and C so as to be supplied with a fixed voltage relative to ground, for example, 150 volts positive. The control electrode or grid of discharge device 2, while control waves are applied thereto, but between positive peaks of said control waves, has a potential sufficiently less than the value of the fixed voltage on the grid of device 3 to cause device 2 to cut off, that is, cause the cessation of anode current flow in this device. In this condition, the devices 2 and 3 are so biased that current normally flows through devices 3 and 1 in series. The current through device 1 is caused to change its path of flow from device 3 to device 2 under control of the positive peaks of control waves emanating from source S, in turn, coupled to the grid of discharge device 2 through blocking condenser 5; provided these positive peaks of the control waves make the grid of device 2 positive with respect to the grid of device 3 by a sufficient amount. Source S may produce sinusoidal waves or spaced D. C. pulses of positive polarity. It will thus be seen that the current flowing through the common cathode circuit discharge device 1 is caused to pass alternately through the discharge devices 2 and 3 under control of the recurring waves from source S, thus reversing the current passing condition of devices 2 and 3. Stated in other words, the anode current of discharge device 1 is commutated so as to flow for short periods of time through device 2 by means of the control waves or commutating signal applied to the grid of device 2.

A diode 4 shunted by a high value resistor 9 (of the order of 1 megohm to 3.5 megohms) serves to limit the maximum D. C. value of the positive peaks of the control waves at the grid of discharge device 2, relative to ground. The cathode of the diode 4 is connected to a tapping point on battery B by way of lead L, and is maintained at a suitable positive potential relative to ground; for example, +155 volts, to determine the critical voltage at which the diode begins to act as a shunt path for the control voltage wave at the grid of device 2.

Output pulses are taken from the anode of discharge device 2 over lead T. These output pulses are of short duration and have an amplitude which is proportional to the instantaneous amplitude of the modulation or intelligence signal applied to the grid of discharge device 1.

A fuller exposition of the operation of the electronic switch will now be given: A positive polarity control wave is applied to the grid of device 2 and the peak D. C. value thereof is made to be greater than the positive bias on the grid of device 3 in order to reverse the current passing conditions of devices 2 and 3. As an illustration, if device 3 normally passes current in series with device 1, the positive bias on the grid of 3 may be +150 volts relative to ground. In this condition, current flows through devices 3 and 1 in series, provided the grid of device 2 has a potential sufficiently less than +150 volts relative to ground to cause device 2 to be cut off. Let it be assumed that device 1 is conducting a current of 2 milliamperes, all of which is passing through device 3, and for such a magnitude of current at a value of anode voltage of device 3 relative to its cathode of approximately +150 volts, the grid-cathode voltage of tube 3 is 5 volts, with the cathode of device 3 positive with respect to the grid of device 3. Let it also be assumed that it requires a bias of −10 volts between the grid and cathode of device 2 to completely cut off the flow of anode current through device 2 at approximately the same voltage of +150 volts appearing between the anode and cathode of device 2. In such a situation, then the potential of the grid of device 2 relative to ground must be +145 volts or less in order for device 2 to be cut off. To cause device 2 to conduct all of the current passing through device 1, the voltage on the grid of device 2 must be raised to +155 volts relative to ground. Under this condtion, the cathode of device 2 relative to ground will be approximately +160 volts, resulting in a net grid-cathode voltage on device 2 of 5 volts with the grid negative relative to the cathode. In this last condition in which discharge device 2 conducts, the flow of current through device 3 will cease because the cathode of device 3 is now 10 volts positive relative to its grid, an amount sufficient to bias device 3 to cut off. It will thus be seen that a change in the grid voltage of device 2 of 10 volts is required to completely switch the flow of current from device 3 to device 2, and vice versa. If the peak value of the control waves is not sufficient to completely switch the flow of current from device 3 to device 2, then both of these devices will share the current flowing through device 1.

Because the voltage change on the anode of device 1 is relatively small compared to the D. C. anode voltage, the current flowing through device 1 will be fairly constant and independent of the switching action between devices 2 and 3. Hence, when all of the current passing through device 1 also passes through device 2, any further increase in positive voltage of the control wave applied to the grid of device 2 will not affect the amount of current flowing through device 2, provided the grid of device 2 does not draw grid current.

In order to obtain a flat frequency response characteristic in the output of the electronic switch, resistor 6 is given a small value, for example, 500 to 1000 ohms. Stated otherwise, the gain obtained in the output taken from the anode of discharge device 2 should be approximately constant over the video band of frequencies applied to the grid of device 1. Such a video band of frequencies may extend from D. C. up to 4 megacycles. Resistor 7 may have the same small value as resistor 6 or may even be zero in value.

When used for passing television picture signals, device 1 is preferably operated in the current cut-off condition for a picture black level signal on its grid, so that there will be no pulse output from the anode of device 2 under this black level signal condition even during the application of a control wave to device 2 of a magnitude which would normally turn on this device on a positive peak of the control wave.

The maximum D. C. value of the positive peak of the control wave at the grid of device 2, relative to ground, is determined by the voltage on the cathode of diode rectifier 4 whose anode is directly connected to the grid of device 2, as shown. Thus, with the foregoing assumptions regarding anode voltages, if the cathode of diode 4 is maintained at +155 volts relative to ground, then the positive peak of the control wave as applied to the grid of device 2 will not appreciably exceed this value, because of the shunting action of the diode at +155 volts. The high value resistor 9 in shunt to the diode 4, acts in combination with condenser 5 to form a time-constant circuit, and serves as a bleeder across the diode. In many applications, the resistor 9 can be omitted. Diode 4 is illustrative of any suitable rectifier, and can take the form of a crystal, if desired.

From a practical viewpoint, the system of Fig. 1 has certain disadvantages, particularly when using high sampling frequencies (viz: control waves at high repetition rates) which render it unsuitable. One of these disadvantages is that the anode-grid capacity of device 2 permits components of the sampling frequency of source S to appear on the anode of device 2 during the absence of current flow through device 2 and/or device 1. Another disadvantage of Fig. 1 is that there is a tendency for device 1 to become non-linear at signal levels near the anode current cut-off condition.

A more practical system than Fig. 1 is shown in Fig. 2 in which the foregoing disadvantages are overcome. The system of Fig. 2 operates in a general sense in a manner similar to the foregoing description given for Fig. 1.

Fig. 2 employs a plurality of pentode evacuated electron discharge devices (vacuum tubes) 11, 12 and 13. The cathodes of devices 12 and 13 are connected together by lead 30, in turn, connected to the anode of device 11. The source of control waves S, which may be sinusoidal waves or recurring pulses of positive polarity, is connected through blocking condenser 15 to the control grid of device 12. The modulation signal (the video input for picture signal in the case of television) is applied to the control grid of device 11 through blocking condenser 21 and over lead 18. It should be noted that the screen grids of devices 12 and 13 are directly connected together through parasitic resistors R, and by way of lead 31′ to the positive terminal of a source of unidirectional current supply furnishing +300 volts relative to ground. The anodes of devices 12 and 13 are connected to this same positive terminal identified as +300 v. through resistors 16 and 17 which preferably are of small value such as 500 to 1000 ohms. In this case, as in the case of Fig. 1, resistor 17 may be made to be of zero value. The suppressor grids of devices 12 and 13 are also connected together and through a lead 32 to a suitable point on the bleeder circuit comprising resistors 23, 24 and 25 in series. This point which is shown as being the junction of resistors 24 and 25 may, by way of example be maintained at a value of +150 volts relative to ground. The suppressor and control grids of device 13 are both directly connected together, as shown, in order to maintain the control grid of device 13 at plus 150 volts.

It should be noted that the suppressor grids of discharge devices 12 and 13 are not connected to the cathodes of their respective devices as might be expected if conventional practice were followed. The reason for this is that the cathodes of devices 12 and 13 fluctuate in voltage during operation and a connection from the cathode to the suppressor of either device 12 or 13 would introduce an undesirable output voltage due to the capacitance within the tube between the anode and the suppressor grid. If desired, the connection between the two suppressor grids of devices 12 and 13 can be broken at device 13 in which case the suppressor grid of device 13 can then be connected to its cathode, while still permitting a positive potential from lead 32 to appear on the suppressor grid of device 12 and on the control grid of device 13.

As in the case of Fig. 1 a rectifier 14, shunted by a high value resistor 19, is connected between the controll grid of device 12 and a voltage source for setting the D. C. value of the positive peaks of the control wave applied to the control grid of device 12. The cathode of rectifier 14 is shown connected via lead 27 to an adjustable tap on resistor 24. Thus, the voltage applied to the cathode of rectifier 14 may be approximately +155 volts, by way of example.

In the case of modulation input signals which have no D. C. components, such as a television picture signal, it is necessary to establish a D. C. component which corresponds to the black level of the picture, and one way of doing this is to use a clamp diode 20 connected between the control grid of device 11 and ground through a suitable network. It should be noted that the diode 20 has two electrode sections, with the cathode of one section and the anode of the other section connected to the control grid of tube 11, and the remaining anode and cathode electrodes of the double diode connected through resistors and a potentiometer P to ground. Positive and negative pulses are simultaneously applied to leads 30 and 31 respectively, during the back porch of the video modulation input signal. This arrangement establishes the D. C. value for black level of the video signal on the grid of device 11. The manner of establishing the black level is well known in the television art and described in the literature, and is not being claimed herein per se.

The cathode of the pentode device 11 is connected to ground through resistor 26. The screen grid of device 11 is connected to the junction point of resistors 27 and 28 forming a voltage divider. This point is chosen to provide the proper operating voltage on the screen of tube 11. Condensers 28′ and 29 are bypass capacitors.

It should be noted that the cathodes of devices 12 and 13 which are connected together by lead 30 and to the anode of device 11 are also connected via resistor 22 to the positive terminal +300 volts. The reason for this is to insure the operation of device 11 always on the linear portion of its anode current-grid voltage characteristic for the entire range of useful picture modulation signal; that is, over the full range from black to maximum white, and that the device 11 does not operate on the lower non-linear portion of its anode current-grid voltage characteristic. Without this resistor 22, at the black level determined by the clamp circuit 20, the device 11 would be cut off for zero pulse output from the anode of tube 12. The connection through resistor 22 from the positive terminal +300 volts to the anode of discharge device 11 enables the passage of a small amount of current through device 11 and through resistor 22 independently of the paths through discharge devices 12 and 13. This small amount of current is selected to cause device 11 to operate at its lowermost point on its linear characteristic and this lowermost point corresponds to black level. Because this amount of current through resistor 22 never passes through devices 12 and 13 it does not appear in the sampled output on the anode of tube 12. By way of example only, the current drawn by device 11, due to the presence of resistor 22, may be 1.5 milliamperes. The resistor 22 is properly chosen to achieve this result. As an illustration, resistor 22 may have a value of the order of 100,000 ohms for the particular values of voltages illustrated and assumed. In order for current to flow through device 12 or 13 in series with device 11, the anode current of pentode 11 must exceed 1.5 milliamperes and it is only the current in excess of 1.5 milliamperes which is actually sampled by the electronic switch. It will thus be seen that instead of device 11 operating at cut-off for black level, as in the case of Fig. 1, it operates in Fig. 2 at an anode current at 1.5 milliamperes for black level, and that this flow of current will assure zero pulse output from device 12 for a black level picture.

A brief description of the operation of the circuit of Fig. 2 will now be given. At black level modulation input, a small amount of current of about 1.5 milliamperes will flow through device 11 and resistor 22, but not through either one of devices 12 or 13. If at this time, the peak positive pulse of the control wave from source S is applied to the control grid of device 12, no current will flow through device 12. If, however, a modulation signal of positive polarity is applied to the control grid of device 11 via lead 18, which has a value greater than black and in the white direction, the anode current of device 11 increases and will flow through device 13 in the absence at this particular instant of the application of a peak positive pulse to the control grid of device 12. The application of the positive peak of a control wave to the control grid of device 12 at this time will switch the flow of current from device 13 to device 12 so that for the duration of this positive peak of the control wave current will flow in series through devices 11 and 12. Thus current will flow through device 12 in pulses at spaced time intervals corresponding to those times during which positive peaks of the control wave occur on the control grid of device 12 and simultaneously therewith modulation input of positive polarity is applied to the control grid of device 11 in excess of black level. Output is taken from the anode of device 12 and is in the form of spaced pulses of negative polarity, each pulse having a magnitude which is proportional to the instantaneous magnitude of the video modulation input signal at the time the pulse occurs. Since the source of control waves occurs at an extremely rapid rate, for example, in the case of television of the order of 3.8 megacycles, it will be evident that the picture signal appearing on lead 18 is sampled at an extremely rapid rate.

Fig. 3 shows the application of applicant's electronic switch to a commutator arrangement in a time division multiplex transmitter. This transmitter is illustrated, by way of example only, as a three-color dot sequential television system employing a commutator at the transmitter having three electronic switches each individual to a particular branch circuit over which it receives modulation in the form of color information. This commutator may be referred to as a sampler. Another commutator is employed at the remote receiver as will be described later in connection with Fig. 4. The transmitter and receiver samplers perform complementary operations at the same relative times.

The color information from the three branch circuits representing three primary colors is obtained by means of the red, green and blue cameras 10, 102 and 104 respectively. These cameras are focused on the image being televised, and each is in a different color channel. By way of example only, each camera may comprise an iconoscope tube or an image orthicon. In front of each camera there may be provided a suitable colored optical filter arranged so that the video signals corresponding to the intensity of only one component color are developed by each camera. The video modulation outputs from the three color cameras are fed over leads 101, 103 and 105 respectively, to the electronic switches 107, 109 and 111, as shown. Each electronic switch comprises a circuit as shown in Fig. 2. The source of control waves S of Fig. 2 corresponds to leads 112, 113 and 114 which extend from the different electronic switches to a three-phase splitter 115, in turn, fed by sine waves from a sampling oscillator 116. The sampling oscillator 116 supplies sinusoidal waves, and these are split up into three components of sine waves each at 120 degrees phase relation relative to the other two, and these three components appear in leads 112, 113 and 114 and are used to sequentially control the passage of pulse information from the different cameras through electronic switches 107, 109 and 111. The phase shifter 115 may comprise suitable circuits of inductance, resistance, and condenser-resistance combinations or artificial delay lines having different electrical lengths. The sampling oscillator 116 may operate at any desired high frequency, preferably of the order of 3.8 megacycles when used in a television system. It will thus be seen that the electronic switches 107, 109 and 111 pass pulses or samples of the applied modulating signals at the same frequency or repetition rate as the sine wave oscillator 116, but the different samples occur at different tmes. The modulation or intelligence applied to each electronic switch by its individual camera is an amplitude varying signal. The pulses from the different electronic switches are of equal duration and are supplied via leads 117, 119 and 121 to a mixer stage 122. The pulses from the electronic switches may be short compared to the time interval between them, contiguous, or even overlapping, depending upon the duration of the peaks of the control waves applied to the electronic switches by the phase splitter. The pulse output from each electronic switch will therefore be an amplitude modulated pulse or sample whose amplitude is a function of the instantaneous amplitude of the modulation at the time the device 12 of the switch passes current. Stated otherwise, the electronic switches are in the nature of modulators and the outputs therefrom are independently modulated by independent programs or modulation.

The combined output from the electronic switches appearing in lead 123 is fed to another mixer 124 where it is combined with a standard synchronizing signal fed in over lead 125. The synchronizing pulse supplied to the mixer 124 may also be used to synchronize the sampling oscillator for the commutator at the remote receiver. The output from the mixer 124 appearing on lead TL is a composite video signal including the synchronizing pulses, and this composite signal is fed to an ultra high frequency transmitter for modulating a single carrier wave. If desired, output lead TL may be connected to a standard wire line or coaxial cable.

When the invention is employed in a telephone multiplex system in which speech waves are employed for the modulation, the pulse rate at which each electronic switch operates should be equal at least to twice that of the highest speech wave frequency. However, when the invention is employed in a three-color television system, as shown in Fig. 3, in which bits of information from three-color channels or branch circuits are sequentially sampled, the pulse rate in each branch or subchannel may be anywhere in the range of 2.8 to 4 megacycles per second, preferably around 3.8 megacycles, and the pulse output from each branch or electronic switch should be less than the 120 degree time interval allotted to it. In this last case, the synchronizing pulses occur at a rate different from the frequency sine wave oscillator 116; for example, 15,750 cycles per second, compared to a sampling frequency of 3,800,000 cycles per second.

Fig. 4 shows how the electronic switches of the invention can be used in an electronic commutator at the receiving terminal of a three-color dot sequential system for receiving signals of the kind sent out by the transmitter of Fig. 3. The receiver of Fig. 4 comprises a radio receiver 50 of the superheterodyne type which receives over antenna 51 the radio wave from the remote transmitter and converts the same to a video pulse wave in its output lead 52. This video pulse wave in lead 52 is a composite video signal. The train of pulses in the output of the receiver is passed on to the pentode electron discharge device 11 via blocking condenser 21 and lead 18. It should be noted that the same elements which appear in Fig. 4 and in Fig. 2 have been given the same reference numerals to identify the same elements. The composite video signal in lead 52 is also passed on to a sync separator 53 which separates the sync pulse from the intelligence carrying branch circuit pulses, by virtue of the differences in their characteristics, and produces on lead 54 a pulse which synchronizes the operation of the sampling oscillator 116′. Suitable synchronizing separators which can be used are well known in both the telephone multiplex and television arts. The sampling oscillator 116′ produces sinusoidal waves and operates at the same frequency as the sine wave oscillator 116 at the remote transmitting terminal Fig. 3.

The electronic commutator of the receiver of Fig. 4 operates in a manner generally similar to that described above in connection with Fig. 2 with certain additions to enable obtaining from the commutator three sequentially occurring pulse outputs for the three different color channels in output circuits represented by video discharge device amplifiers 60, 61 and 62. The different video amplifiers 60, 61 and 62 feed different reproducers over their respective leads 63, 65 and 67. These reproducers may be kinescope tubes, or if desired a single kinescope capable of reproducing the three different colors.

The output from the sampling oscillator 116′ is fed to a three-phase splitter 115′ which produces in its output three sinusoidal phase displaced waves on leads 112′, 113′ and 114′. The phase displaced waves on these last leads are time displaced at 120 degree intervals relative to each other for sequentially controlling or keying the receiving commutator, thereby enabling the different color channels to sequentially receive the bits of color information assigned to them and transmitted from the remote transmitter.

The commutator of Fig. 4 includes evacuated pentode electron discharge devices 11, 12 and 13, which are interconnected with each other in the same manner as shown in Fig. 2. It should be noted that pentode 12 has connected to its control grid the rectifier 14, in turn, shunted by the high value resistor 19 in the same manner as the circuit of Fig. 2. The control grid of device 12 is fed with control waves through blocking condenser 15 via lead 112′. Two additional switching electron discharge devices 12′ and 12″ are connected to device 11 in substantially the same manner as is device 12. These two devices 12′ and 12″ have individual thereto rectifiers 14′ and 14″ each shunted by high value resistors 19′ or 19″. All three discharge devices 12, 12′ and 12″ are similarly arranged, although the control grids thereof are supplied with control waves over different leads 112′, 113′ and 114′, as the result of which these pentode devices 12, 12′ and 12″ sequentially pass pulses of modulation therethrough and supply them to different output color channels represented by leads 57, 58 and 59. Lead 57 feeds its signal through a video amplifier 60 to lead 63 extending to a red signal reproducer, lead 58 feeds its signal through a video amplifier 61 to lead 65 extending to a green signal reproducer, while lead 59 feeds its signal through a video amplifier 62 to lead 67 extending to a blue signal reproducer. Since the control waves from the phase splitter 115′ are at the same frequency but phase displaced at 120 degree intervals, it will be seen that first one device 12 passes the modulation supplied thereto through device 11, then device 12 will be cut off and device 12' will pass modulation supplied thereto through device 11, then device 12' will be cut off and device 12'' will pass modulation supplied thereto through device 11. This cycle of operation will repeat itself. During the time when none of the discharge devices 12, 12' and 12'' are conducting, device 13 will be conducting over a path including device 11 in series therewith.

The pentode discharge device 11 and its associated clamp diode 20 for setting the D. C. level operates in the same manner as described before in connection with the same numbered elements in Fig. 2. The positive and negative clamp pulses on leads 30 and 31 are supplied by clamp pulse generator 32 which, in turn, is actuated over lead 33 extending to the output of the sync separator 53.

In summarizing the operation of the receiver of Fig. 4, the receiving electronic commutator operates synchronously with the transmitting electronic commutator and feeds the selected pulses to each of the signal reproducers in succession. For instance, the information modulation originated in one branch circuit or color channel at the transmitting terminal Fig. 3 (corresponding let us say to the red color), will be fed to the signal reproducer in the corresponding branch circuit or color channel at the receiving terminal Fig. 4, while the information or modulation originating in another branch circuit or color channel at the transmitting terminal (for example the green color), will be fed to the signal reproducer in the corresponding branch circuit or color channel at the receiving terminal, and similarly in regard to the third branch circuit or color channel (for example the blue color). The commutator at the receiver, in effect, samples the composite video signal and passes on to the different outputs pulses whose amplitudes are determined by the amplitude of the composite wave at that particular instant. The iconoscope or signal reproducer which is controlled by the video amplifier in any one receiving color channel will have a particular color producing phosphor. Thus, the three different iconoscopes will have different appropriate color producing phosphors. The monochrome color records thus produced are then optically combined to form a complete television color image.

Among the advantages of the electronic switch of the invention, particularly when used in connection with the color television system of Figs. 3 and 4 are: (*a*) An extremely short output pulse can be obtained from the electronic switch without resorting to the use of pulse shapers. (*b*) High voltage level pulse outputs are obtainable. (*c*) The amplitude of the pulse modulated signal can be made to be higher than the applied video signal. (*d*) Signals below black level are prevented from appearing on the output; that is, sync pulses are clipped off. (*e*) The electronic switch avoids balance problems inherent in more conventional modulators. (*f*) There is avoided the need for balanced drive by enabling the use of single-ended drive of oscillations of the sampling frequency, and (*g*) It is relatively inexpensive to manufacture.

The term "ground" used in the description and appended claims is not limited to an actual earthed connection and is deemed to include any reference point of fixed or zero R. F. potential.

What I claim is:

1. An electronic switch comprising a pair of electron discharge devices each having a control electrode, a cathode and an anode, a third electron discharge device having an anode, a cathode and a control electrode, a direct current connection from said last anode to the cathodes of said pair of devices, a direct current connection from the cathode of said third device to ground, whereby said third device is in the common cathode circuit of said pair of devices, means for supplying a potential to said anodes of said pair of devices which is positive relative to ground, a source of modulation coupled to the control electrode of said third device, means for differently biasing the devices of said pair, and means for applying recuring waves of such peak magnitude and polarity to the control electrode of one device of said pair as to overcome at least in part the bias thereon and thereby enable current to pass therethrough.

2. An electronic switch comprising a pair of electron discharge devices having a grid-controlled discharge device in the common cathode circuit thereof, means for applying a signal wave to the grid of said last discharge device, means whereby recurring waves of positive polarity applied to the grid of one device of said pair cuts off the flow of current through the other device of said pair, said means including a source of unidirectional potential having a positive terminal connected to the anodes of said pair of devices and a negative terminal connected to the cathode of said grid-controlled discharge device in the common cathode circuit, an effective connection from a point intermediate said terminals to the grid of said other device of said pair, a rectifier coupled between the grid of said one device and another point intermediate said terminals for setting the direct current value of the positive peak of said recurring waves, and means for abstracting output pulses from said one device.

3. An electronic switch comprising a pair of electron discharge devices having a common cathode impedance, means for varying the value of said impedance in accordance with the amplitude value of a varying signal, means coupled to said common cathode impedance for enabling a predetermined value of current to flow therethrough without passing through either of said pair of discharge devices, and means whereby recurring waves of positive polarity applied to the grid of one device cut off the flow of current through the other device.

4. An electronic switch comprising a pair of electron discharge devices each provided with a control grid, a screen grid, a cathode and an anode, a connection capable of passing direct current connected between said screen grids, a common cathode circuit including an electron discharge device therein for said pair of devices, means for applying a signal wave to the grid of said last device, said last device having an anode connected to the cathodes of said pair of devices and having a cathode connected to ground, means for applying positive potentials relative to ground to the anodes of said pair of devices and a lesser positive potential to the cathodes of said pair of devices, and means whereby recurring waves of positive polarity relative to ground applied to the control grid of one device of said pair cut off the flow of current through the other device of said pair.

5. An electronic switch comprising a pair of electron discharge devices each provided with a control grid, a screen grid, a cathode and an anode, a connection capable of passing direct current connected between said screen grids, a common cathode circuit including an electron discharge device therein for said pair of devices, means for applying a signal wave to the grid of said last device, said last device having an anode connected to the cathodes of said pair of devices and having a cathode connected to ground, means for applying positive potentials relative to ground to the anodes of said pair of devices and a lesser positive potential to the cathodes of said pair of devices, and means whereby recurring waves of positive polarity relative to ground applied to the control grid of one device of said pair cut off the flow of current through the other device of said pair, a rectifier coupled between the control grid of said one device and a source of unidirectional potential for setting the direct current value of the positive peak of said recurring waves, and an output circuit coupled to the anode of said one device of said pair.

6. An electronic switch comprising a pair of electron discharge devices each provided with a control grid, a screen grid, a cathode and an anode, a connection capable of passing direct current connected between said screen grids, a common cathode circuit including an electron discharge device therein for said pair of devices, means for applying a signal wave to the grid of said last device, said last device having an anode connected to the cathodes of said pair of devices and having a cathode connected to ground, means for maintaining the anodes of said pair of devices at a positive potential relative to ground and maintaining an electrode of said common cathode circuit discharge device other than its cathode at a lesser positive potential relative to ground, and means whereby recurring waves of positive polarity relative to ground applied to the control grid of one device of said pair cut off the flow of current through the other device of said pair.

7. An electronic switch comprising a pair of pentode vacuum tubes having a common cathode circuit, said common cathode circuit including another pentode vacuum tube whose cathode is connected to ground through a resistor, direct current connections between corresponding screen and suppressor grids of said pair of tubes, a source of unidirectional potential for supplying the anodes of said pair of tubes with a positive potential relative to ground and the cathodes of said pair of tubes with a lesser value of positive potential relative to ground, a connection between the suppressor grid and control grid of one tube of said pair, a connection for maintaining said control grid of said one tube of said pair at a fixed potential which is positive relative to ground, means whereby recurring waves of positive polarity relative to ground applied to the control grid of the other tube of said pair cut off the flow of current through said one tube of said pair, means for applying a modulated signal to the pentode tube in said common cathode circuit, and an output circuit coupled to the anode of the other tube of said pair.

8. An electronic switch comprising a pair of pentode vacuum tubes having a common cathode circuit, said common cathode circuit including another pentode vacuum tube whose cathode is connected to ground through a resistor, direct current connections between corresponding screen and suppressor grids of said pair of tubes, a source of unidirectional potential for supplying the anodes of said pair of tubes with a positive potential relative to ground and the cathodes of said pair of tubes with a lesser value of positive potential relative to ground, a connection between the suppressor grid and control grid of one tube of said pair, a connection for maintaining said control grid of said one tube of said pair at a fixed potential which is positive relative to ground, means whereby recurring waves of positive polarity relative to ground applied to the control grid of the other tube of said pair cut off the flow of current through said one tube of said pair, means for applying an amplitude modulated signal of positive polarity to the control grid of the pentode tube in said common cathode circuit, and a rectifier coupled to the control grid of the other tube of said pair for setting the direct current value of the positive peak of said recurring waves.

9. An electronic commutator comprising a plurality of electronic switches each including first and second electron discharge devices having a third electron discharge device in the common cathode circuit thereof, means for supplying the grid of the second device of each switch with a relatively fixed direct current voltage relative to ground, means for supplying the grid of the first device of each switch with a recurring voltage wave, and means for supplying a signal to be passed by each switch to the grid of the third device; a single source for supplying said recurring voltage waves for said plurality of switches, and means between said source and said switches for time displacing the waves supplied to any one switch relative to those supplied to any other switch.

10. A time division multiplex system employing an electronic commutator comprising a plurality of electronic switches each including first and second electron discharge devices having a third electron discharge device in the cathode circuit thereof, means for supplying the grid of the second device of each switch with a relatively fixed direct current voltage relative to ground, means for supplying the grid of the first device of each switch with a recurring voltage wave, an output connection to the anode of said first device of each switch, and means for supplying a signal to be passed by each switch to the grid of the third device; a single source for supplying said recurring voltage waves for said plurality of switches, and means between said source and said switches for time displacing the waves supplied to any one switch relative to those supplied to any other switch, and means coupled to the output connections of said electronic switches for mixing the output waves therefrom.

11. An electronic commutator comprising a plurality of vacuum tubes having a common cathode circuit, an electron discharge device in said common cathode circuit and having its cathode connected to ground through a resistor, means for supplying a signal to be passed by said commutator to the grid of said electron discharge device, means for supplying recurring positive voltages waves to the grids of said vacuum tubes but at different times, different output circuits coupled to the different anodes of said vacuum tubes, means for setting the direct current value of the positive peak of the recurring voltage waves applied to the grids of said vacuum tubes, said last means including rectifiers individually coupled to said grids of said vacuum tubes, and means for maintaining the anodes of said vacuum tubes at a positive potential relative to ground and the cathodes of said vacuum tubes at a lesser positive potential relative to ground.

12. An electronic commutator comprising a plurality of vacuum tubes having a common cathode circuit, an electron discharge device in said common cathode circuit and having its cathode connected to ground through a resistor, means for supplying a signal to be passed by said commutator to the grid of said electron discharge device, means for supplying recurring positive voltage waves to the grids of said vacuum tubes but at different times, different output circuits coupled to the different anodes of said vacuum tubes, still another vacuum tube having its cathode connected directly to the cathodes of said first vacuum tubes so as to share said common cathode circuit, and means for supplying the grid of said other vacuum tube with a fixed positive voltage relative to ground.

13. A time division color television system employing an electronic commutator comprising a plurality of vacuum tubes having a common cathode circuit, an electron discharge device in said common cathode circuit and having its cathode connected to ground through a resistor, means for supplying a composite video signal to be passed by said commutator to the grid of said electron discharge device, means for supplying recurring positive voltage waves to the grids of said vacuum tubes but at different times, different output circuits coupled to the different anodes of said vacuum tubes, still another vacuum tube having its cathode connected directly to the cathodes of said first vacuum tubes so as to share said common cathode circuit, and means for supplying the grid of said other vacuum tube with a fixed positive voltage relative to ground, each output circuit including a video amplifier and means for reproducing the color information therein.

14. An electronic switch comprising a pair of electron discharge devices each having a grid, an anode and a cathode, a direct connection between the cathodes of said devices, means for applying a signal to be passed by said switch to said connection, means for differently biasing said devices whereby one device is in the anode current cut-off condition, and the other device passes current, means for applying recurring waves to the grid of said one device, said waves having a peak value sufficient to enable said one device to pass anode current and to thereby reduce the flow of current in said other device, and a unidirectional current passing valve shunted by a resistor coupled between the grid and cathode of said one device.

15. An electronic commutator comprising a plurality of electronic switches each including a pair of discharge devices having a common cathode circuit, means for differently biasing the devices of each pair such that one device is normally cut-off, means for respectively applying different waves to be passed by said switches to the different common cathode circuits of said switches, and means coupled to the grids of the normally cut-off devices of the different pairs for applying recurring control waves thereto, said control waves being applied to the different switches in phase displaced relation and having such peak value as to overcome the cut-off bias of said one device.

16. An electronic commutator comprising a plurality of electronic switches each including a pair of discharge devices having a common cathode circuit, means for differently biasing the devices of each pair such that one device is normally cut off, a separate diode shunted by a resistor coupled between the grid and cathode of each respective normally cut-off device, means for respectively applying different waves to be passed by said switches to the different common cathode circuits of said switches, and means coupled to the grids of the normally cut-off devices of the different pairs for applying recurring control waves thereto, said control waves being applied to the different switches in phase displaced relation and having such peak value as to overcome the cut-off bias of said one device.

EDWIN A. GOLDBERG.

REFERENCES CITED

The following references are of record in the file of this patent:

UNITED STATES PATENTS

| Number | Name | Date |
|---|---|---|
| 2,445,448 | Miller | July 20, 1948 |
| 2,465,371 | Grieg | Mar. 29, 1949 |
| 2,489,269 | Cleeton | Nov. 29, 1949 |
| 2,521,010 | Homrighous | Sept. 5, 1950 |
| 2,572,016 | Elbourne | Oct. 23, 1951 |
| 2,572,792 | White | Oct. 23, 1951 |